United States Patent
Burrola et al.

(10) Patent No.: US 6,877,526 B2
(45) Date of Patent: Apr. 12, 2005

(54) MAGNETIC ACTUATOR AND METHOD

(75) Inventors: Santos Burrola, Chihuahua (MX); Alejandro Moreno, El Paso, TX (US)

(73) Assignee: Delphi Technologies, Inc., Troy, MI (US)

( * ) Notice: Subject to any disclaimer, the term of this patent is extended or adjusted under 35 U.S.C. 154(b) by 0 days.

(21) Appl. No.: 10/612,155

(22) Filed: Jul. 2, 2003

(65) Prior Publication Data

US 2005/0000579 A1 Jan. 6, 2005

(51) Int. Cl.$^7$ .............................................. F15B 13/043
(52) U.S. Cl. ............................. 137/596.17; 251/129.14
(58) Field of Search .................. 137/596.17; 251/129.14

(56) References Cited

U.S. PATENT DOCUMENTS

| | | | |
|---|---|---|---|
| 4,578,662 A | * 3/1986 | Slavin et al. ............ | 137/625.65 |
| 4,679,593 A | 7/1987 | Sanders ................. | 137/625.65 |
| 4,998,559 A | * 3/1991 | McAuliffe, Jr. ........ | 137/596.17 |
| 5,076,323 A | * 12/1991 | Schudt ................... | 137/596.17 |
| 5,104,091 A | 4/1992 | Rathay et al. ......... | 251/121.14 |
| 5,606,992 A | * 3/1997 | Erickson et al. ....... | 137/596.17 |
| 5,707,039 A | 1/1998 | Hamilton et al. ...... | 251/129.17 |
| 5,915,416 A | 6/1999 | Okazaki et al. ........ | 137/596.17 |
| 6,019,203 A | 2/2000 | Patel et al. ................ | 192/3.3 |
| 6,116,269 A | 9/2000 | Maxson ..................... | 137/487.5 |
| 6,189,519 B1 | 2/2001 | Press et al. | |
| 6,308,725 B1 | 10/2001 | Lawlyes et al. .............. | 137/14 |
| 6,422,360 B1 | 7/2002 | Oliver et al. | |
| 6,615,780 B1 | 9/2003 | Lin et al. | |
| 6,619,616 B1 | * 9/2003 | Sudani et al. .......... | 137/596.17 |
| 2002/0145125 A1 | 10/2002 | Tomoda et al. ........ | 251/129.15 |
| 2002/0190234 A1 | 12/2002 | Carrillo et al. ........ | 251/129.08 |
| 2003/0037825 A1 | * 2/2003 | Runge et al. .......... | 137/596.17 |

FOREIGN PATENT DOCUMENTS

| | | |
|---|---|---|
| DE | 10036905 | 10/2001 |
| JP | 09280391 | 10/1997 |

* cited by examiner

Primary Examiner—Gerald A. Michalsky
(74) Attorney, Agent, or Firm—Jimmy L. Funke

(57) ABSTRACT

A magnetic actuator includes a spool surrounded by a coil, a primary plate disposed at a first end of the spool, and a secondary plate disposed at a second end opposite the first end. A plunger is slidably disposed within respective annular portions defined by the spool and the secondary plate and surrounded by the coil energizable to urge the plunger toward the primary plate. A first spring biases a ball against a supply valve seat configured in either the primary plate or a valve seat assembly, while a rod having a first portion is in operable communication with the plunger and a second portion is in contact with the ball opposite the first spring. A second spring biases the plunger and rod toward an exhaust valve seat configured in either the primary plate or valve seat assembly, opposite the supply valve seat, wherein the supply exhaust valve seats are in fluid communication with each other via a bore therebetween connecting the supply exhaust valve seats. The bore is in further fluid communication with a control port intermediate the supply and exhaust valve seats, thus integrating the seats of the supply and exhaust ports, as well as the control port into one component.

11 Claims, 4 Drawing Sheets

MAGNETIC ACTUATOR AND METHOD

TECHNICAL FIELD

The present invention is related to solenoid operated control valves, and particularly such valves having application with lubricating hydraulic fluids in a hydro-mechanical apparatus such as motor vehicle automatic transmissions.

BACKGROUND

It will be recognized that a solenoid assembly can be used in various actuator assemblies for actuation of a certain component and not limited to motor vehicles or internal combustion engines. One use for an actuator assembly having a solenoid involves a vehicle automatic transmission. Electromechanical solenoid operated control valves are widely used in the area of electronically controlled automatic transmissions. Two general types of such control valves include pulse width modulated (PWM) and linear control valves. Both types are responsive to a control quantity, typically time varying voltage or current, to control line pressure, clutch chamber pressure or pilot pressure in a spool valve. It is generally understood that PWM valves have an armature which strokes between first and second positions substantially in frequency correspondence with a time varying voltage signal while a linear control valve has an armature which assumes an equilibrium position in accordance with the electromagnetic force generated by the average current through the solenoid coil and internal bias spring and hydraulic forces.

Low leak solenoids are used in automatic transmissions to get smooth shifting with the advantage of reducing mechanical load of the oil pump. A solenoid is used to provide pressure control or flow output proportional to the pulse width modulated voltage or current level.

Two primary actuator configurations exist to provide pressure control or flow output proportional to an electrical control signal. A proseal configuration allows inlet pressure to create a hydraulic force that biases a ball or poppet against a valve seat to seal the valve seat, wherein increased inlet pressure aids in seating the ball against the valve seat. In a contraseal configuration, inlet pressure acts to break a seal between a poppet and valve seat, wherein the pressure at which the seal is broken is limited to a high spring preload that acts axially against the poppet to counter the inlet pressure and maintain a seal between the poppet and valve seat.

Both of the above configurations require a magnetic package that generates a magnetic flux strong enough to overcome the spring preloads associated with known contraseal and proseal configurations. Furthermore, high mechanical forces created as result of overcoming the high spring preloads increase wear between components. Moreover, higher mechanical forces cause misalignment between components because larger axial forces project into larger radial forces. For these above reasons, a proseal configuration is the preferred design choice.

In one contraseal configuration illustrated in FIG. 1, multiple components are assembled together that can affect dimensional stack up and is a significant source of part-to-part variation resulting in variation of the stroke of the valve. Dimensional stack up also poses potential alignment issues.

As such, the present invention has recognized these prior art drawbacks, and has provided the below-disclosed solutions to one or more of the prior art deficiencies.

SUMMARY

In an exemplary embodiment, a method for reducing stroke variation in a magnetic actuator assembly is disclosed. The method includes integrating corresponding valve seats of a supply port and an exhaust port into a valve seat assembly; and disposing a control port in fluid communication with a bore coupling the valve seats of the supply and exhaust ports.

In another embodiment, a method to reduce the radial forces projected from the axial forces acting on a magnetic actuator assembly is disclosed. The method includes detachably coupling a non-magnetic rod to a magnetic plunger; configuring the rod having a first portion and a second portion, wherein an interface between the first and second portions is stepped and defined by a shoulder therebetween. The first portion is adapted to float relative to connection with the plunger while the second portion coaxially aligns with a corresponding valve seat. Furthermore, the second portion of the rod operably acts against a ball biased against the valve seat limiting fluid communication therethrough.

In yet another embodiment, a magnetic actuator assembly is disclosed. The magnetic actuator assembly includes a spool surrounded by a coil, a primary plate assembly (stop and primary plate) disposed at a first end of the spool, and a secondary plate disposed at a second end opposite the first end. A plunger is slidably disposed within respective annular portions defined by the spool and the secondary plate and surrounded by the coil energizable to urge the plunger toward the primary plate assembly. A first spring biases a ball against a supply valve seat configured in either the primary plate or a separate valve seat assembly, while a rod having a first portion is in operable communication with the plunger and a second portion is in contact with the ball opposite the first spring. A second spring biases the plunger and rod toward an exhaust valve seat configured in either the primary plate or valve seat assembly opposite the supply valve seat, wherein the supply exhaust valve seats are in fluid communication with each other via a bore therebetween connecting the supply and exhaust valve seats. The bore is in further fluid communication with a control port intermediate the supply and exhaust valve seats, thus integrating the seats of the supply and exhaust ports, as well as the control port into one component.

The above discussed and other features and advantages of the present invention will be appreciated and understood by those skilled in the art from the following brief description of the drawings.

BRIEF DESCRIPTION OF THE DRAWINGS

Referring to the exemplary drawings wherein like elements are numbered alike in the several Figures.

DETAILED DESCRIPTION

According to one aspect of the invention, a solenoid assembly in a proseal configuration is provided which reduces the number of components and combines functions into other components resulting in a reduction of the number of component stack up of critical dimensions, stroke variation, alignment issues, and manufacturing processes. For ease of comparison, a prior art contraseal solenoid valve will first be described.

Figure 1:
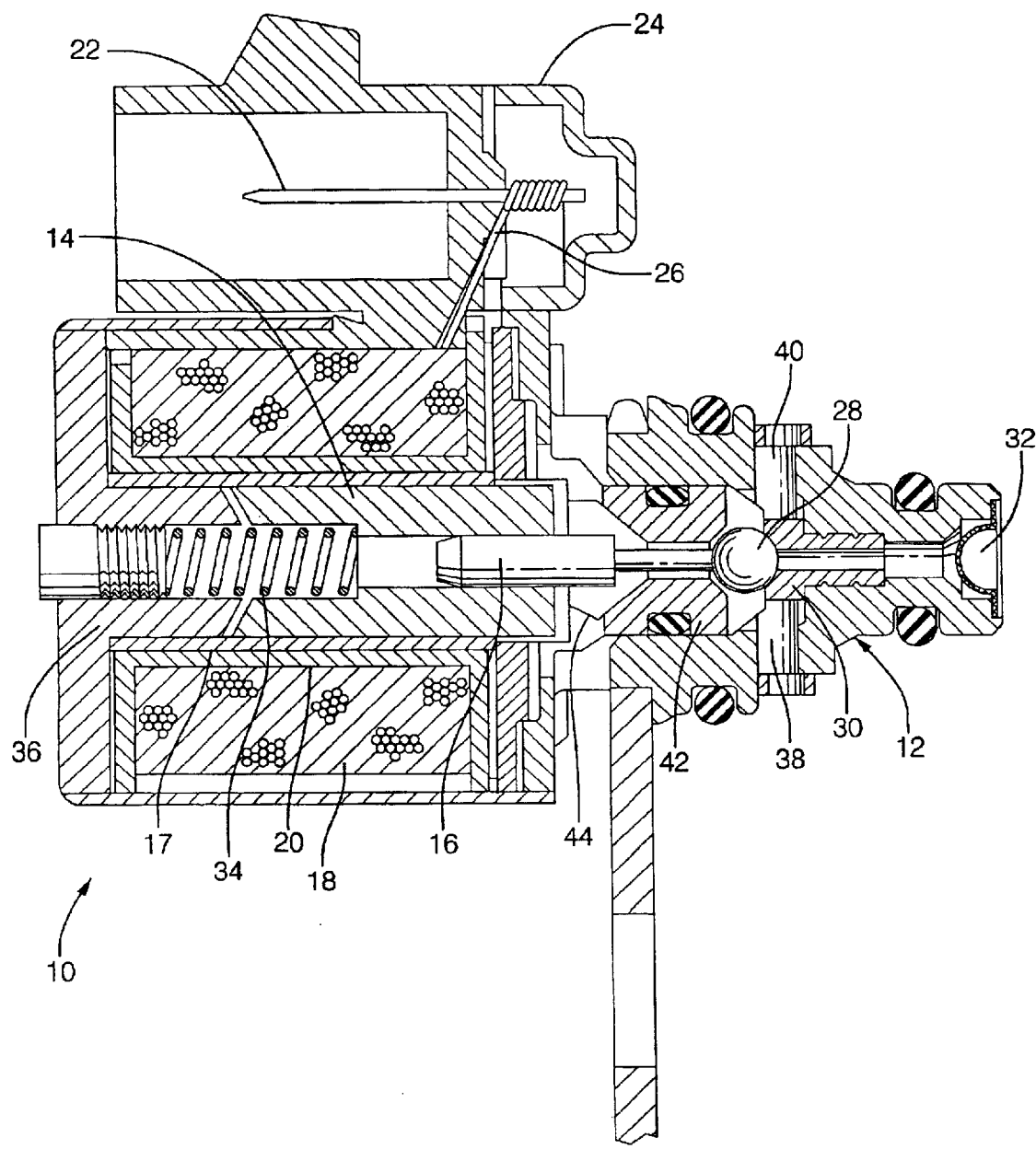
FIG. 1 is a cross sectional view of a prior art solenoid valve having a contraseal configuration.

FIG. 1 illustrates a prior art solenoid valve 10 commonly used in automotive applications for controlling pressure of a fluid (e.g., air, liquid or gas). An outer housing 12 shown in FIG. 1 surrounds a solenoid assembly which includes an armature 14, rod 16 and a coil assembly. The coil assembly includes a sleeve 17, coil 18 surrounding the sleeve, a spool 20, and electrical terminals 22 within a connector body 24 operably connected to wires 26 extending from coil 18. The solenoid sleeve 17 acts as a guide for the armature 14 and rod 16, which are press fit together. On end of rod 16 biases a ball 28 against a housing insert 30 having an orifice in fluid communication with a supply port 32; the rod is axially biased at an opposite end with a spring 34 to bias ball 28 in a normally closed position to prevent flow of system fluid from supply port 32. The inside of the solenoid sleeve 17 is exposed to a system pressure during certain operating modes and thus serves as a pressure chamber. The system fluid acts against ball 28, positioned upstream from the open end of the sleeve. The ball 28 is pushed to the right, as illustrated, (upstream) by spring 34, in order to close the orifice in housing insert 30 acting as a supply valve seat.

In operation, a system fluid enters into housing insert 30 from a fluid source (not shown) and applies pressure to ball 28. Meanwhile, coil 18 has been activated by a voltage applied to terminals 22, and coil 18 creates a magnetic force which is applied to rod 16 by armature 14. The left-directed axially applied magnetic force causes armature 14 and rod 16 to translate toward a primary plate 36 and compress spring 34, which in turn, allows ball 28 to translate to the left via fluid pressure from supply port 32. This movement breaks the seal between ball 28 and the seat of housing insert 30 and opens the orifice thereof. The fluid then enters into the valve body 38 having fluid communication with control ports 40; it travels around rod 16, through an exhaust valve seat 42, and continues around rod 16 and through exhaust ports 44. As the armature travels axially under the applied voltage, the ball 28 seats against exhaust valve seat 42 closing off passage of fluid to exhaust ports 44. When the voltage is removed from coil 18, the left-directed force is removed from rod 16 and the rod moves back to the right as a result of spring 34 pushing ball 32 against the seat of housing insert 30 and seals off the orifice of housing insert 30, thereby cutting off the flow of fluid to and reducing the pressure inside solenoid assembly 10.

Figure 2:
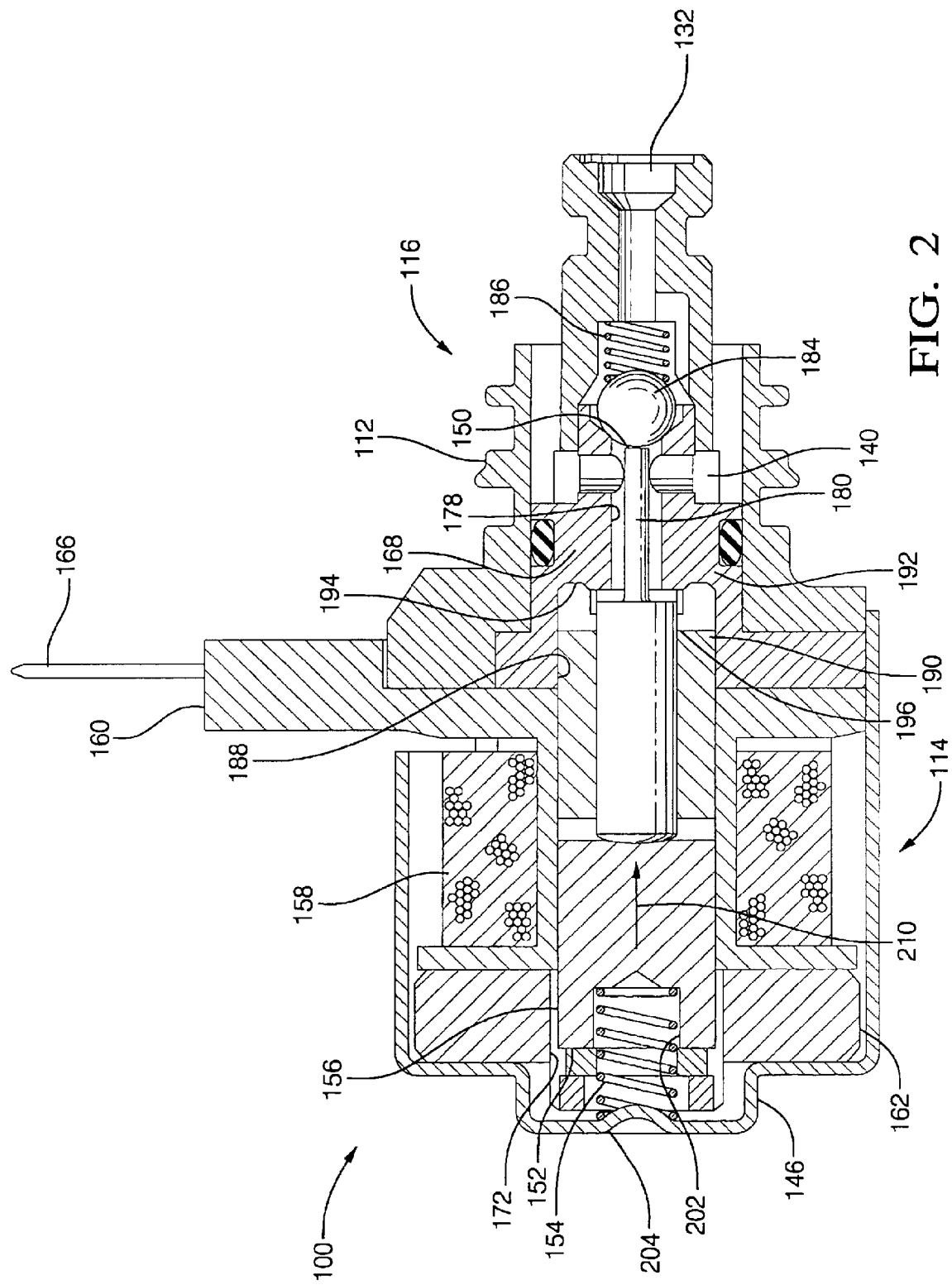
FIG. 2 is a cross sectional view of an exemplary embodiment of a solenoid valve assembly having a proseal configuration illustrating a ball in the normally closed position.
Figure 3:
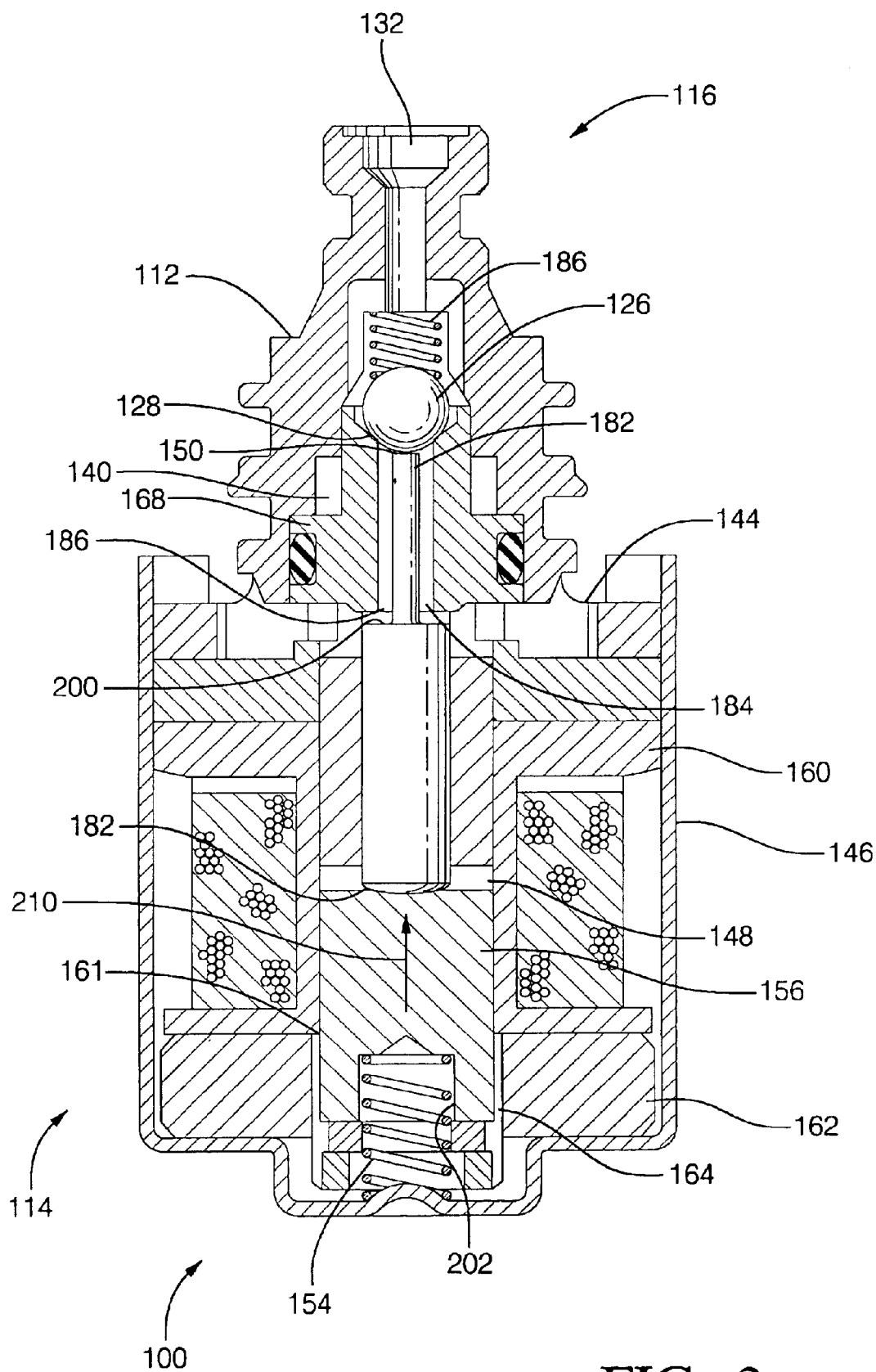
FIG. 3 is a cross sectional view of the solenoid valve assembly of FIG. 2 rotated 90 degrees illustrating side exhaust ports associated therewith.

Referring now to FIGS. 2 and 3, a valve assembly 100 is illustrated. Valve assembly 100 includes an electromechanical portion generally designated by numeral 114 and a hydraulic portion generally designated by the numeral 116. The hydraulic portion 116 comprises fluid passage housing 112 having a supply port 132 in fluid communication with a supply fluid system, chamber 126, valve seat 128 providing fluid communication to control ports 140 and fluid exhaust ports 144. A ball 184, which is displaceable between a seated position against valve seat 128 as illustrated and a fully unseated position, provides for variable fluid bleed-off from supply port 132 to control port 140 when the ball is in the fully unseated position such that the rod step closes exhaust from supply port. Aspects of fluidic operation are generally well known to those skilled in the art and further discussion thereof is not necessary for a complete understanding of the present invention.

The electromechanical portion 114 of valve assembly 100 includes a frame or case 146 operably attached to housing 112 of hydraulic portion 116. Case 146 is configured to receive a plunger 156 and a rod 180 therein. Plunger 156 is configured having a spring end 152. Rod 180 is configured having a valve end 150. Valve end 150 is configured to provide a means for urging ball 128 from a normally closed position to allow fluid to flow from supply port 132 to exhaust ports 144 and control ports 140 via chamber 126. Spring end 152 is configured to make contact with a spring 154. As will be discussed in detail below, spring 154 is employed to provide a preload on plunger 156 by providing a biasing force for maintaining the plunger assembly 156 in a first position.

In an exemplary embodiment, valve assembly 100 is secured to a conduit supplying a hydraulic fluid for use in automotive applications such as an automatic transmission. Of course, and as contemplated in accordance with the instant application, valve assembly 100 may be secured to any type of conduit or tube supplying a liquid, gas or pressurized gas from a supply to a desired location.

Valve assembly 100 is constructed so that a plunger 156 is manipulated between a closed position (see FIGS. 2 and 3), a partial open position, and a full open position (not shown).

The electromechanical portion 114 of solenoid valve assembly 100 is generally constructed with a multiple winding electrical coil 158 surrounding an armature or plunger 156 fabricated from a ferromagnetic material. Coil 158 is conventionally wrapped around a non-magnetic spool 160 as illustrated. Spool 160 is preferably configured with an alignment feature 161, such as a slot or tab for example, to align with a ferromagnetic secondary pole piece or secondary plate 162 abutting thereto. This slotted/tabbed interface controls concentricity of abutting spool 160 and secondary plate 162 therebetween while a secondary magnetic air gap 164 between plunger 156 and secondary plate 162 may be reduced to improve the resultant magnetic force therebetween. Spool 160 further includes terminals 166 extending therefrom that are electrically connected to end wires forming coil 158. Terminals 166 are preferably insert molded during manufacture of spool 160. In this manner, a connector body is eliminated to provide a coil wire—to coil terminal connection interface.

A ferromagnetic primary pole piece or primary plate, generally designated 168, is located at an opposite axial end of spool 160. Each plate 162 and 168 has a respective substantially annular portion, 172 and 178, defining a respective bore thereof. Annular portion 172 of secondary plate 162 is defined by an inner sidewall configured to receive plunger 156 therethrough while an inner wall defining an annular portion of spool 160 is similarly configured to guide translation of plunger 156 therethrough.

Annular portion 178 of primary plate 168 is defined by an inner sidewall configured to allow fluid communication therethrough from supply port 132 while allowing translation of a rod 180 operably connected to plunger 156. One end of primary plate 168 includes a first orifice 182 defined by supply valve seat 148 for fluid communication with supply port 132 while an opposite end includes a second orifice 184 defining an exhaust valve seat 186 in fluid communication with exhaust ports 144 as best seen with reference to FIG. 3.

Plunger 156 is configured with a cavity 182 to receive rod 180 in operable communication with a ball 184 biased against valve seat 128 formed in primary plate 168 via fluid pressure from supply port 132 and a linear spring 186. One end of linear spring 186 is seated at one end defining chamber 126 while an another opposite end of spring 186 biases ball 184 against seat 128. Rod 180 is configured to be axially received in cavity 182 and axially aligned within the annular portion 178 of a stop 190. Annular portion 178 of primary plate 168 extends to define a stepped bore 188 larger than annular portion 178. An inner wall defining bore 188 is similarly configured and flushly abuts the inner wall defining spool 160. A stop 190 is disposed within bore 188 and is configured with a lip 192 to align with a complementary channel 194 configured in a shoulder defining the interface between annular portion 178 and bore 188 of primary plate. Stop 190 is further defined with an opening 196 to allow translation of rod 180 therethrough. More specifically, opening 196 is sized to allow translation of a larger cylindrical section 198 of rod 180 therethrough while an end surface 200 defining one end of the larger cylindrical section 198 is configured to seat against exhaust valve seat 186 formed in primary plate 168. End surface 200 abuts exhaust valve seat 186 formed in primary plate 168 in the fully open position.

Rod 180 is aligned with valve seat 128 by means of aligning stop 190 with primary plate 168 having valve seat 128 configured therein. Further, rod 180 is not fixedly attached to plunger 156 allowing floating alignment between valve seat 128 and rod 180. Rod 180 is made of a non-magnetic material to prevent it from sticking to opening 196 of stop 190 and reduce radial forces that create friction and cause wear between the interfacing components. End surface 200 defining larger cylindrical section 198 of rod 180 is preferably case hardened to limit wear at the exhaust seat area of primary plate 168. When coil 158 is energized with enough current, plunger 156 urges translation of rod to bias ball 184 to open against an opposite bias of linear spring 186 and hydraulic pressure from supply port 132 against ball 184. If enough current is present, plunger 156 biases end surface of rod 180 against exhaust valve seat 184 to prevent further fluid flow out exhaust ports 144.

It will be recognized by the above description that exhaust port 144 communicate fluid from chamber 126 to the atmosphere in a short path away from the magnetic flux path of the electromechanical portion 114. In this manner, the exhaust fluid path with the exhaust valve seat open is away from the magnetic flux path, thus providing a more robust side exhaust port configuration ensuring against contamination failures as a result of a build up of metallic contaminants that may exist in the fluid, such as metal shavings from gears in the transmission fluid, for example.

It should be noted that the addition of stop 190 aligned with primary plate 168 helps in controlling an air gap by avoiding mechanical contact of the plunger 156 and stop 190 and by controlling reduced magnetic forces when exhaust port 144 is closed as a result of end surface 200 of rod 180 abutting exhaust valve seat 186 of primary plate 168. The absence or an excessively small air gap that can allow the plunger to come in contact with the stop face at the primary air gap will cause these two components to magnetically lock when the actuator is de-energized. Magnetic lock occurs when parasitic or residual current in the coil produces sufficient magnetic force on the plunger that it is prevented from returning to its de-energized position.

At the axial end of the armature plunger 156 closest to secondary plate 162 is a bore defined by a wall 202. Located within the bore and communicating with the base thereof is contact spring 154. The wall is preferably tapered to prevent spring 154 from binding within the bore. The opposite end of spring 154 bears against the interior bottom defining case 146.

Figure 4:
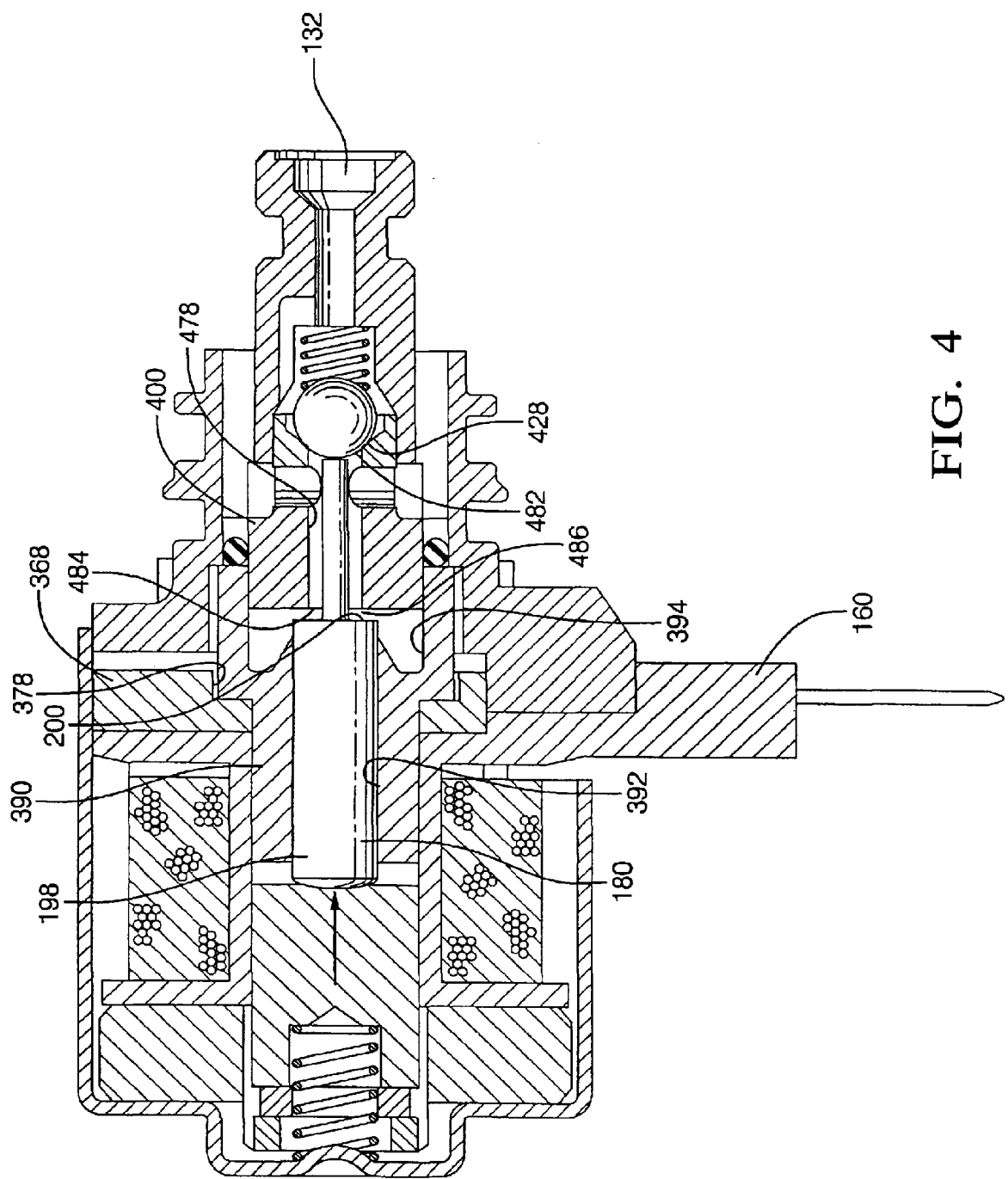
FIG. 4 is a cross sectional view of another exemplary embodiment of a solenoid valve assembly having a proseal configuration illustrating a ball in the normally closed position against a valve seat assembly independent of a primary plate.

Referring now to FIG. 4, another exemplary embodiment depicts a separable ferromagnetic primary pole piece or primary plate, generally designated 368, located at the opposite axial end of spool 160. Primary plate 368 has a substantially annular stepped portion, 378, defining a respective stepped bore thereof. The stepped bore is configured to receive a stop 390 therein. Stop 390 defines a first bore 392 at one end configured to receive a valve end of plunger 180 therethrough. Stop 390 further defines a second bore 394 at an opposite end configured to receive a valve seat assembly 400 therein. Valve seat assembly 400 is configured to be press fit within bore 394 while stop 390 is preferably staked within stepped portion 378, however, other coupling means are also contemplated.

Valve seat assembly 400 includes an annular portion 478 defined by an inner sidewall configured to allow fluid communication therethrough from supply port 132 while allowing translation of a rod 180 operably connected to plunger 156. One end of valve seat assembly 400 includes a first orifice 482 defined by supply valve seat 428 for fluid communication with supply port 132 while an opposite end includes a second orifice 484 defining an exhaust valve seat 486 in fluid communication with exhaust ports (not shown).

Stop 390 is disposed within bore 188 defined by spool 160. Stop 390 defined with bore 392 allows translation of rod 180 therethrough. More specifically, bore 396 is sized to allow translation of a larger cylindrical section 198 of rod 180 therethrough while an end surface 200 defining one end of the larger cylindrical section 198 is configured to seat against exhaust valve seat 486 formed in valve seat assembly 400. End surface 200 abuts exhaust valve seat 486 formed in valve seat assembly 400 in the fully open position.

Rod 180 is aligned with valve seat 428 by means of aligning stop 390 with valve seat assembly 400 having valve seat 428 configured therein. Further, rod 180 is not fixedly attached to plunger 156 allowing floating alignment between valve seat 428 and rod 180. Rod 180 is made of a non-magnetic material to prevent it from sticking to bore 392 of stop 390 and reduce radial forces that create friction and cause wear between the interfacing components. End surface 200 defining larger cylindrical section 198 of rod 180 is preferably case hardened to limit wear at the exhaust seat area of valve seat assembly 400. When coil 158 is energized with enough current, plunger 156 urges translation of rod to push ball 184 to open against an opposite bias of linear spring 186 and hydraulic pressure from supply port 132 against ball 184. If enough current is present, plunger 156 biases end surface of rod 180 against exhaust valve seat 484 to prevent further fluid flow out the exhaust ports.

Plunger 156 is constructed out of material that will be moved by a magnetic flux generated by the coil assembly of the valve assembly. Accordingly, and in accordance with the present disclosure plunger 156 is magnetically actuated in a direction defined by arrow 210. Plunger 156 and rod 180 are cylindrical in shape, however, of course, plunger 156 and rod 180 may have any configuration suitable for movement within secondary and primary plates 162, 168, respectively.

The opening point for the valve is critical since the force in the magnetic circuits is limited in magnitude and must be capable of overcoming the friction between nonmovable and movable parts. To overcome the above problems, a dual spring valve assembly is employed using springs 154 and 186 on opposite sides of ball 184 in operable communication with plunger 156 and rod 180. Spring 186 provides a preload to help bias the ball against the supply to control port seat. Spring 154 aids the magnetic circuit producing a preload in the direction of the magnetic force while maintaining contact between the three movable components, i.e., plunger 156, rod 180, and ball 184.

In accordance with an exemplary embodiment of the present disclosure, valve assembly 100 operates as follows. A first electrical current flows through coil 158, which creates a magnetic flux causing plunger 156 to move towards valve seat 128 and compress spring 186 after any net force between the hydraulic force, and springs 154 and 186 preloads is met.

A pulse-width-modulated source or a stepped current or voltage source or any of the other well-known electrical controls may be employed to energize coil 158. When coil 158 is energized, a magnetic field is established which induces a magnetic path through the secondary and primary plates 162 and 168, respectively, and spool 160. This creates magnetic forces which collectively urge plunger 156 and rod 180 against ball 184 in an upward direction as seen in FIG. 3 acting in the same direction 210 as a bias from spring 154.

The exemplary embodiment described above is fundamentally of proportional behavior which means that the output is controlled by means of controlling the plunger's displacement or position with an input control signal. The input control signal is preferably generated from a PWM voltage driver. It will be recognized by one skilled in the pertinent art that when a PWM voltage driver is employed, the break point between low flow and high flow with reference to FIGS. 2 and 3 will vary as a function of temperature and voltage variation effect.

By reducing the number of components in the above described proseal configuration, the stack up of critical dimensions, alignment of components, and manufacturing process is improved. The above disclosed actuator eliminates the alignment problem created by the attachment of the rod to the plunger, and the spring calibration for a desired output pressure. Integrating the supply and exhaust valve seats in the primary plate reduces stack tolerances and variation in stroke and alignment, while a detached non-magnetic rod aids alignment. Such integration in the primary plate also provides for an exhaust fluid path away from the magnetic flux path. The use of two springs (one on each end of the assembly) to maintain the contact of the three moving components: plunger, rod and ball, also eliminates spring calibration during manufacture of the actuator, thus improving manufacturing layout and cycle time, resulting in a leaner manufacturing process. Furthermore, the use of two opposing springs reduces the spring preload, thus reducing the axial mechanical forces that project into radial forces, thereby increasing the durability of the actuator.

In addition, the above spool design is configured with terminals moldably inserted eliminating a connector body. Further, the secondary plate and spool interface is preferably slotted/tabbed to control concentricity therebetween while the secondary magnetic air gap is reduced in order to improve the resultant magnetic force.

While the invention has been described with reference to a preferred embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A magnetic actuator assembly comprising:

a spool surrounded by a coil;

a primary plate disposed at a first end of said spool;

a secondary plate disposed at a second end opposite said first end;

a plunger slidably disposed within respective annular portions defined by said spool and said secondary plate and surrounded by said coil energizable to urge said plunger toward said primary plate;

a first spring biasing a ball against a supply valve seat configured in one of said primary plate and a valve seat assembly, a non-magnetic rod having a first portion in operable communication with said plunger and a second portion in contact with said ball opposite said first spring, wherein said rod is stepped and defined by a shoulder defining an interface between said first and second portions said rod, said second portion configured to be translatable within a bore while allowing fluid communication between said supply valve seat and an exhaust valve seat, said first portion configured to seal said exhaust valve seat when said shoulder abuts said exhaust valve seat, and wherein said first portion of said rod is detachably coupled to said plunger via a cavity configured in said plunger, said cavity allowing said first portion of said rod to float therein to allow said second portion of said rod to align with at least one of said bore and said supply valve seat; and a second spring biasing said plunger and rod toward said exhaust valve seat configured in said one of said primary plate and said valve seat assembly opposite said supply valve seat, wherein said supply valve seat and said exhaust valve seat are in fluid communication with each other via said bore in said one of said primary plate and said valve seat assembly connecting said supply valve seat and said exhaust valve seat, said bore having a control port intermediate said supply valve seat and said exhaust valve seat.

2. The assembly of claim 1 further comprising a stop disposed within a stepped annular portion defined by said primary plate, said stop having an opening corresponding to a perimeter defining said first portion of said rod, said stop configured to control an air gap setting of said plunger.

3. The assembly of claim 2, wherein said stop prevents contact between said plunger and said primary plate when said plunger is fully translated toward said primary plate and reduces magnetic flux acting on a fluid in said bore when said exhaust valve seat is closed.

4. The assembly of claim 1, wherein said exhaust valve seat is in fluid communication with an exhaust port creating an exhaust fluid path therebetween distal from a magnetic flux path when said coil is energized.

5. The assembly of claim 1, wherein said spool includes terminals extending therefrom for connection with an energizing power source.

6. The assembly of claim 1, wherein said spool and said secondary plate include one of a slotted and a tabbed interface configured to control concentricity therebetween while reducing a secondary magnetic air gap between said secondary plate and said plunger.

7. The assembly of claim 1, wherein said first and second springs maintain contact between said plunger, said rod, and said ball.

8. The assembly of claim 7, wherein said second spring has a second preload less than a first preload of said first spring, said second preload configured to be adjustable to control the amount of said magnetic flux needed to overcome a net total preload of said first and second springs opposing said magnetic flux.

9. The assembly of claim 8, wherein said plunger effected by said net total preload of said first spring and said second spring in series communication when said plunger matches said net total preload.

10. The assembly of claim 1, wherein the assembly is a proseal configuration, said first and second springs opposing each other allowing reduced axial forces between components of the assembly thus projecting less radial forces.

11. The assembly of claim 1, wherein integration of said supply valve seat, said exhaust valve seat, and said control port with said one of said primary plate and said valve assembly allows for custom de-energized stroke setting.

* * * * *